United States Patent
Kita et al.

[11] Patent Number: 5,870,868
[45] Date of Patent: Feb. 16, 1999

[54] OUTER PANEL FOR AIR CONDITIONER

[75] Inventors: Tomohiro Kita; Hideyuki Sato, both of Osaka, Japan

[73] Assignee: Sinko Kogyo Co., Ltd., Osaka, Japan

[21] Appl. No.: 873,245

[22] Filed: Jun. 11, 1997

[30] Foreign Application Priority Data

Jun. 25, 1996 [JP] Japan .................................. 8-163997

[51] Int. Cl.$^6$ ........................................................ E04C 2/38
[52] U.S. Cl. ................. 52/309.9; 52/309.15; 52/784.13; 52/784.15; 52/802.1; 312/140; 403/403; 403/231
[58] Field of Search ................................ 52/309.5, 309.9, 52/309.14, 802.1, 800.1, 800.12, 796.12, 794.1, 792.1, 588.1, 580, 656.9, 784.13, 784.15; 312/140, 108, 111; 403/403, 171, 231; 49/496.1, 501

[56] References Cited

U.S. PATENT DOCUMENTS

| | | | |
|---|---|---|---|
| 2,889,593 | 6/1959 | Harbison | 49/496.1 |
| 2,956,705 | 10/1960 | Clingman | 312/140 X |
| 3,182,846 | 5/1965 | La Kaff | 312/140 X |
| 3,750,333 | 8/1973 | Vance | 52/802.1 X |
| 3,987,588 | 10/1976 | Imperial et al. | 52/802.1 X |
| 4,303,289 | 12/1981 | Hardy | 312/140 X |
| 4,502,260 | 3/1985 | Machler | 52/656.9 |
| 4,656,795 | 4/1987 | Albrecht et al. | 52/800.1 X |
| 4,691,970 | 9/1987 | Neri | 312/140 X |
| 5,577,363 | 11/1996 | Tate et al. | 52/800.1 X |
| 5,720,142 | 2/1998 | Morrison | 52/309.9 |

FOREIGN PATENT DOCUMENTS

59-18274  2/1984  Japan .

*Primary Examiner*—Carl D. Friedman
*Assistant Examiner*—Winnie S. Yip
*Attorney, Agent, or Firm*—Bacon & Thomas

[57] ABSTRACT

An outer frame (71) is formed by orderly connecting four connecting blocks (74) arranged at predetermined intervals with four beam members (75). The connecting block (74) is made of heat insulating synthetic resin as well as the beam member (75). A lower cover (73) is fitted in a lower surface of the outer frame (71) and an upper cover (72) is fitted in an upper surface of the outer frame (71). Foamable synthetic resin is charged into a panel space (P) enclosed by the outer frame (71) and both the covers (72), (73) from a filling port (84).

4 Claims, 8 Drawing Sheets

OUTER PANEL FOR AIR CONDITIONER

BACKGROUND OF THE INVENTION

1. Technical Field

This invention relates to an outer panel adapted to be attached to an outer surface of a frame of an air conditioner.

2. Description of the Earlier Technology

There is an outer panel of this kind, which fills a space between two steel cover plates with foamed urethane resin for securing heat insulation. The insulating outer panel has been manufactured according to the following procedures.

First, the two cover plates are disposed to vertically face each other at a predetermined interval. Then, a mold plate is pressed against each of four sides of the upper and the lower cover plates and the space between the upper and the lower cover plates is charged with urethane resin under that condition. After the foaming of the urethane resin has finished, the mold plates are removed.

With the outer panel of the above-mentioned conventional construction, during the charging or the foaming of the urethane resin, the urethane resin is apt to leak from clearances at contact portions between the cover plates and the mold plates. When the leaked resin attaches to the outer surfaces of the cover plates and cures there, it becomes necessary to remove the cured resin from the outer surfaces of the cover plates. Accordingly, the outer panel takes much labor to be manufactured and tends to be damaged in its outlook.

SUMMARY OF THE INVENTION

It is an object of the present invention to provide an outer panel which can be efficiently manufactured and well finished. Another object of the present invention is to provide an outer panel which can be attached to a frame airtightly.

The invention of claim 1 has constructed the outer panel for an air conditioner as follows.

An outer frame is formed by orderly connecting heat insulating blocks arranged at predetermined intervals with beam members. A first cover is fitted in a first side of the outer frame to cover a first opening of the outer frame. A second cover is fitted in a second side of the outer frame to cover a second opening of the outer frame. Foamable synthetic resin is charged into a panel space enclosed by the outer frame and both the covers.

Further, the invention of claim 4 forms from synthetic resin the outer frame of the outer panel to be attached to the frame of the air conditioner and constructs the outer frame from a main body portion and a plurality of skirt-like lips extending longitudinally of the outer frame. Then it projects the lips integrally from a side of the main body portion.

BRIEF DESCRIPTION OF THE DRAWINGS

FIGS. 1 to 10 show one embodiment of the present invention;

DESCRIPTION OF THE PREFERRED EMBODIMENTS

Hereafter, one embodiment of the present invention will be explained with reference to FIGS. 1 through 10.

First, a fan coil unit of floor type to which an outer panel according to the present invention is applied will be schematically explained with reference to FIGS. 2 through 4.

A casing 1 of the fan coil unit is constructed by orderly connecting a first, a second and a third, namely three cases 1a, 1b, 1c in the left and right direction by a plurality of tightening members (not illustrated). A maintenance side (S) is provided before a front surface (F) of the casing 1.

A control panel 2 and a multiblade fan 3 are disposed vertically within the first case 1a respectively. A heat exchanger 5 and a humidifier 6 are disposed side by side in the left and right direction within a rightward portion of the second case 1b, and an air filter 7 is disposed within a left portion of the third case 1c.

A spiral case 9 and an electric motor 10 of the fan 3 are supported by a base portion of the first case 1a through a vibration-proof support frame 11. A right side of the first case 1a is covered by a right plate 13 extending in the front and rear direction, and a suction port 3a of the fan 3 is connected to a lower opening portion of the right plate 13. Further, the fan 3 and the control panel 2 are separated by an intermediate partition plate 14, and a delivery port 3b of the fan 3 is connected to a rear opening portion (not illustrated) of the intermediate partition plate 14. The delivery port 3b is communicated with an air supplying opening 15 formed in a top surface of the first case 1a through a space behind the control panel 2.

The humidifier 6 and the heat exchanger 5 are supported by a base portion of the second case 1b. The heat exchanger 5 is provided with two lines, namely a hot-water coil line 18 and a cold-water coil line 19. Respective flows of coil lines 18, 19 are controlled by electrically operated valves 20, 21.

A left side of the third case 1c is covered with a left plate 24, and the air filter 7 is connected to an opening portion (not illustrated) of the left plate 24. The air filter 7 is communicated with a return air opening 25 formed in a top surface of the third case 1c.

The heat exchanger 5 within the second case 1b is connected to the left plate 24 of the third case 1c. A right portion of an upper surface of the heat exchanger 5 is covered with an upper plate 22.

A first opening 31 formed in the front surface of the first case 1a comprises an upper opening 31a and a lower opening 31b. The upper opening 31a is airtightly covered with an upper door 41a and the lower opening 31b is airtightly covered with a lower door 41b. These upper and lower doors 41a, 41b compose a first door 41. The upper door 41a constructs a panel face of the control panel 2 and can be provided with indication lamps and the likes.

A second opening 32 formed in the front surface of the second case 1b comprises a left opening 32a and a right opening 32b. The left opening 32a is airtightly covered with a left door 42a and the right opening 32b is airtightly covered with a right door 42b. These left and right doors 42a, 42b compose a second door 42.

A third opening 33 formed in the front surface of the third case 1c is airtightly covered with a third door 43.

Figure 4:
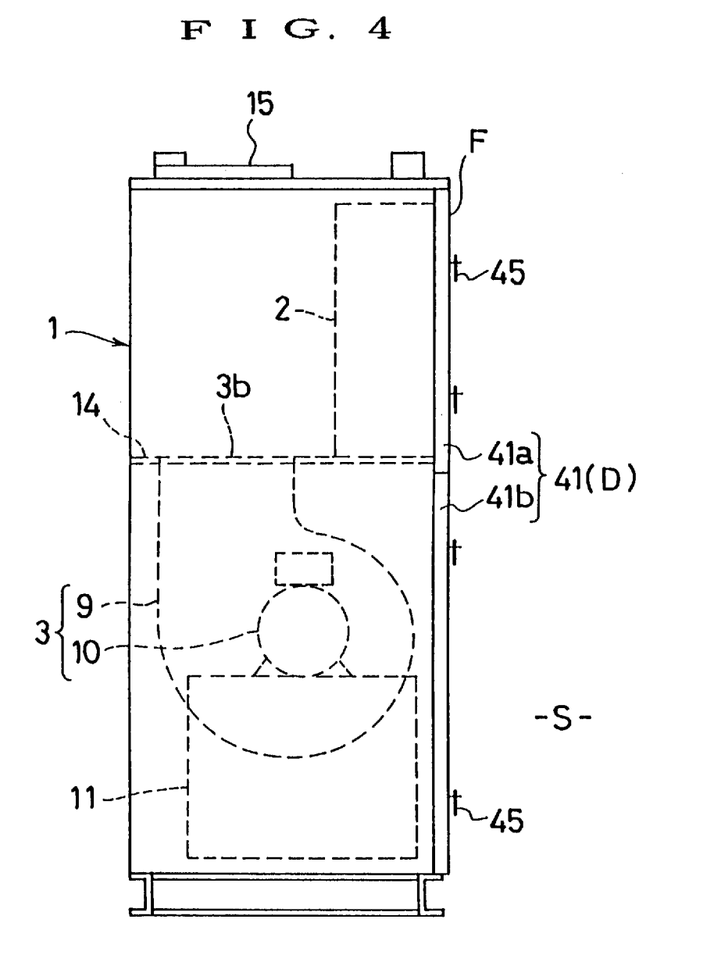
FIG. 4 is a left side view of the fan coil unit.
Figure 5A:
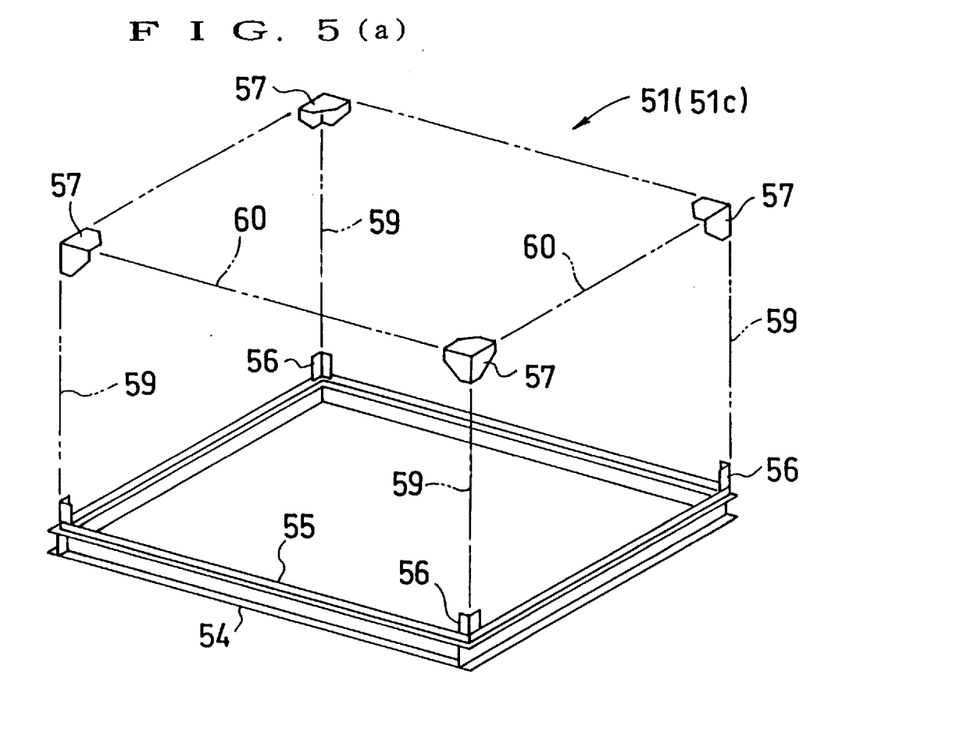
FIG. 5(a) is a schematic view showing a frame of the fan coil unit.

The respective doors 41a, 41b, 42a, 42b, 43 are supported by a frame 51 (refer to FIG. 5) to be described later through hinges (not illustrated) so as to be able to be pivotably opened and closed in the front and rear direction and each brought into airtight contact with an edge portion of each opening by a plurality of handle locks 45 (refer to FIG. 4).

A maintenance opening (M) of the casing 1 comprises the first opening 31, the second opening 32 and the third opening 33. Further, a maintenance door (D) comprises the first door 41, the second door 42 and the third door 43.

Figure 8A:
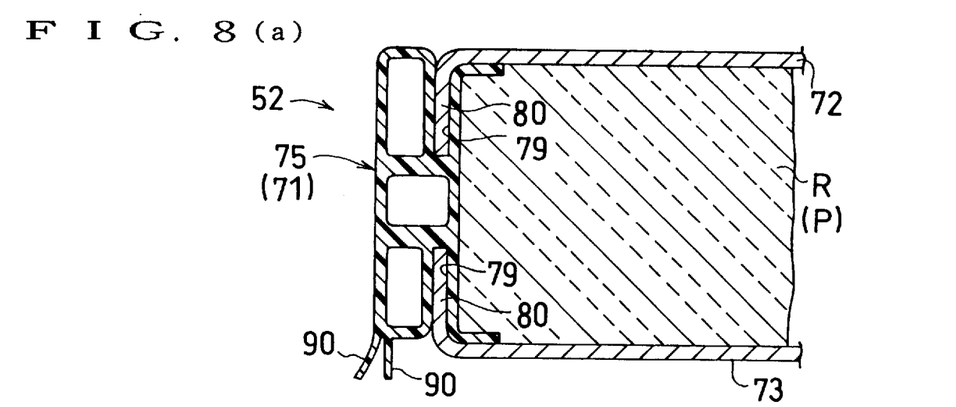
FIG. 8(a) is a partial sectional view of another location of the outer panel and the sectional view taken along the VIII—VIII directed line in FIG. 1(c)
Figure 8B:
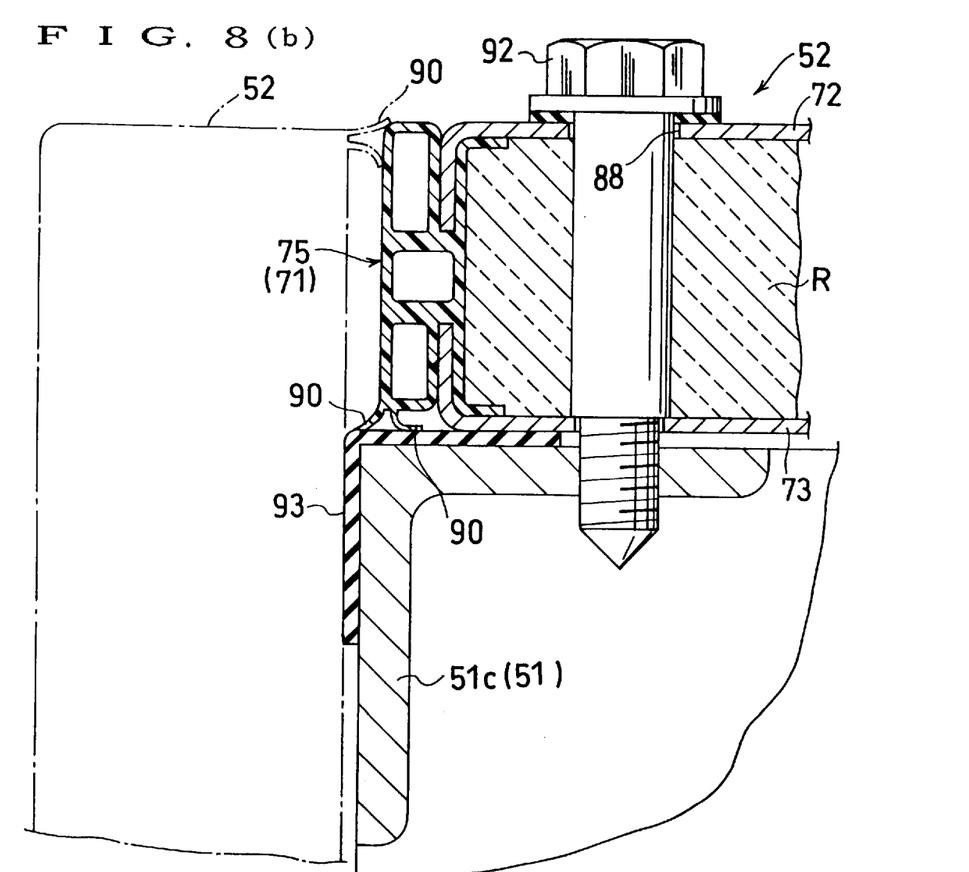
FIG. 8(b) shows such a state that the outer panel is attached to the frame.

Wall surfaces except the front surface (F) of the casing 1 are covered airtightly with a plurality of panels 52 (refer to FIG. 8) fixed to the frame 51 by small screws. The maintenance door (D) and the screw-fixed panels 52 compose the outer panel of the fan coil unit.

An air passage (A) for heat exchanging is formed within the interior space of the casing 1 by the four partition plates 13, 14, 22, 24 extending in the front and rear direction.

Figure 2:
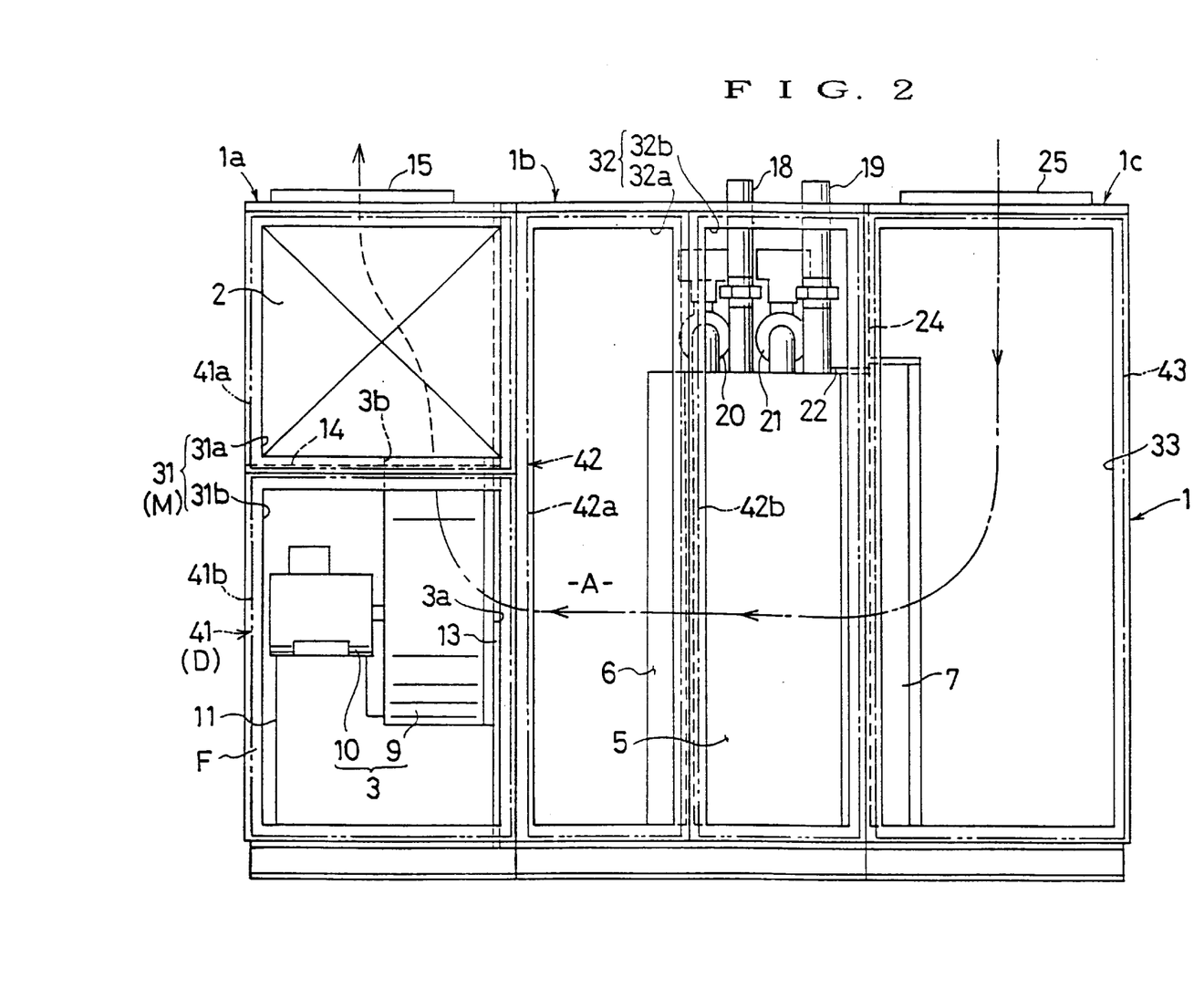
FIG. 2 is a front view of a fan coil unit to which the outer panel is applied.

More specifically, when the fan 3 is operated, as indicated by an arrow in FIG. 2, the air outside the casing 1 passes through the return air opening 25, the air filter 7, the heat exchanger 5, the humidifier 6, the fan 3, the space behind the control panel 2 and the air supplying opening 15 in order and then goes out of the casing 1.

Figure 5B:
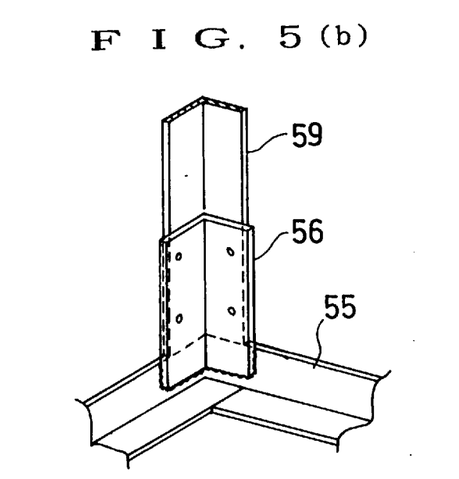
FIG. 5(b) shows a lower corner portion of the frame.
Figure 5C:
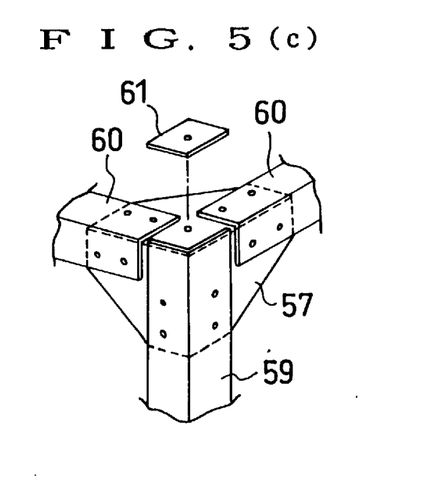
FIG. 5(c) illustrates an upper corner portion of the frame.

The frames of the respective cases 1a, 1b, 1c are constructed by frameworks in the shape of rectangular parallelepipeds each having substantially the same configuration and manufactured as shown in FIG. 5. FIG. 5(a) is a schematic view of a frame 51c of the third case 1c. FIG. 5(b) is a view showing a lower corner portion of the frame 51c. FIG. 5(c) is a view showing an upper corner portion of the frame 51c.

The frame 51c has a base 54, a panel holder 55 fixedly secured to an upper surface of the base 54 by means of welding and four lower corner members 56 fixedly secured to corner portions of the panel holder 55 by means of welding. Column angle members 59 and beam angle members 60 are orderly connected to the lower corner members 56 and upper corner members 57 by means of fasteners (not illustrated) such as a plurality of small screws or bolts. Thereby, the frame 51c is constructed by the framework like the rectangular parallelepiped.

A gasket 61 is adhered to a portion of an upper surface of the upper corner member 57 so that an upper surface of the gasket 61 can be positioned at the same level as those of the upper surface of the beam angle member 60 and the upper end surface of the column angle member 59.

Next, the screw-fixed panels 52 (refer to FIG. 8) which cover the frame 51c airtightly will be explained with reference to FIG. 1 and FIGS. 6 through 8.

Figure 1A:
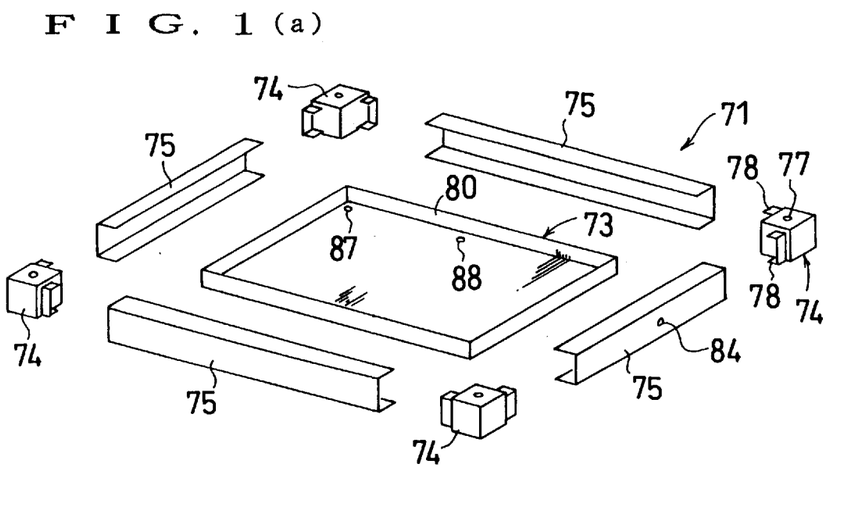
FIG. 1(a) is a schematic view showing the state of component parts before assembling an outer panel.
Figure 1B:
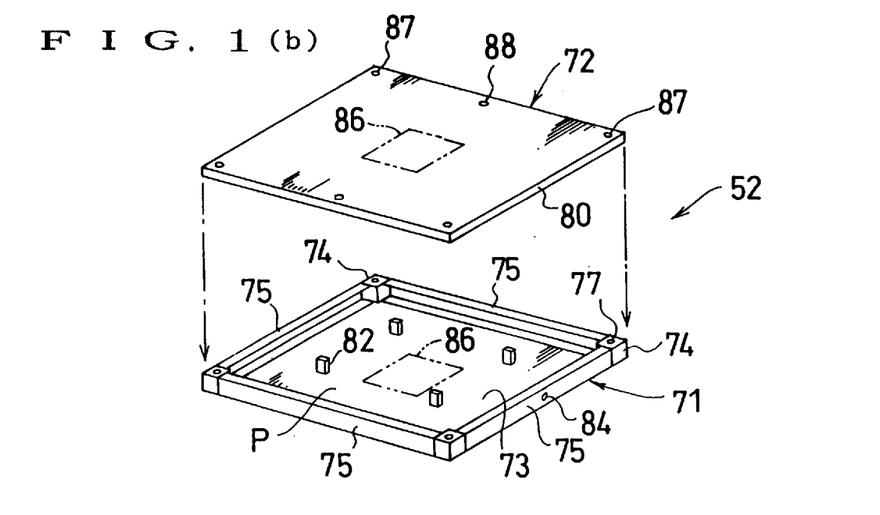
FIG. 1(b) shows a midway state of the assembly.
Figure 1C:
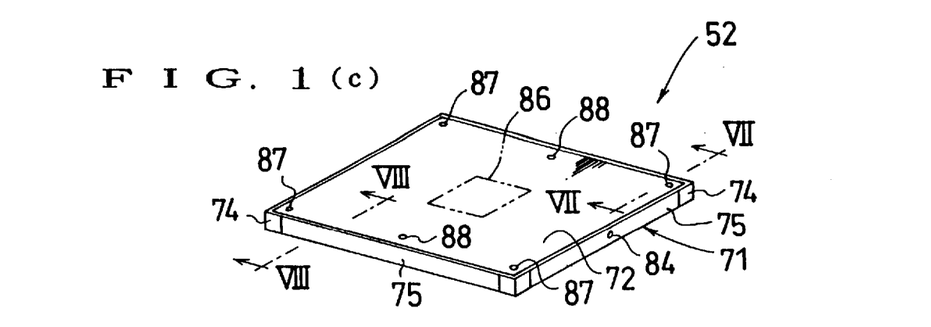
FIG. 1(c) shows a completed state of the assembly.
Figure 6:
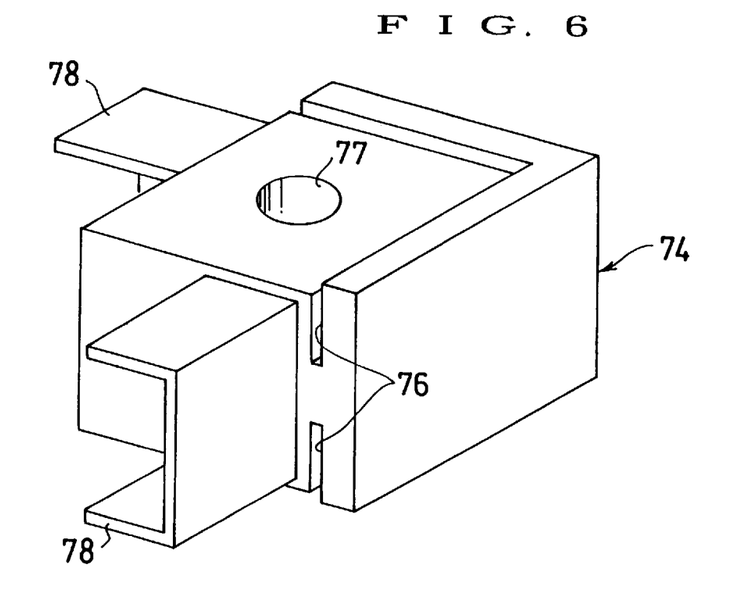
FIG. 6 is a perspective view of a connecting block of the outer panel.
Figure 7:
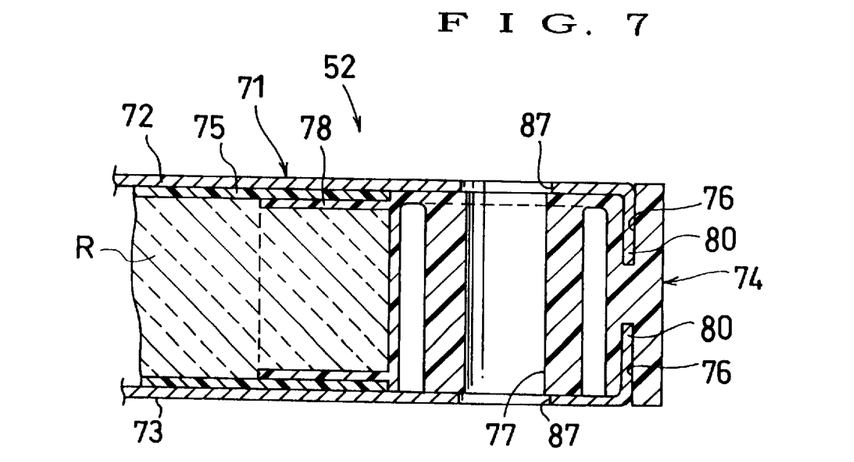
FIG. 7 is a partial sectional view of the outer panel and the sectional view taken along the VII—VII directed line in FIG. 1(c)

FIG. 1 is a schematic view showing a manufacturing procedure of the panel 52; FIG. 1(a) shows states of component parts before being assembled; FIG. 1(b) shows a midway state of the assembly; and FIG. 1(c) shows a completed state of the assembly. FIG. 6 is a perspective view of a connecting block 74 as a component part of the panel 52. FIG. 7 is a sectional view taken along the VII—VII directed line in FIG. 1(c). FIG. 8(a) is a sectional view taken along the VIII—VIII directed line in FIG. 1(c), and FIG. 8(b) is a view showing such a state that the panel 52 is attached to the frame 51c.

Mainly as shown in FIG. 1(b), the panel 52 comprises an outer frame 71 made of synthetic resin and upper and lower (a first and a second) covers 72, 73 which cover upper and lower openings of the outer frame 71. These covers 72, 73 are constructed by steel plates plated with aluminium-zinc alloy and finished smoothly and beautifully. The outer frame 71 is constructed by orderly connecting four corner connecting blocks 74 and four beam members 75 to one another. The connecting block 74 is made of heat insulating synthetic resin, and the beam member 75 is also made of heat insulating synthetic resin.

Each of the covers 72, 73 may be constructed by applying paint to a galvanized steel plate.

As shown in FIG. 6 or FIG. 7, block grooves 76, 76 are formed at a periphery of an upper side of the connecting block 74 and at a periphery of a lower side thereof. Numeral 77 designates an insertion hole for a bolt or a small screw. Numeral 78 indicates a projection adapted to be fitted into the beam member 75.

As shown in FIG. 8(a), beam grooves 79, 79 are formed in an upper side and a lower side of the beam member 75.

Further, as shown in FIG. 7 and FIG. 8(a), the respective covers 72, 73 are provided at their peripheral portions with substantially straight and perpendicular flange portions 80 adapted to be fitted into the block grooves 76 and the beam grooves 79 respectively.

Assembling procedures of the panel 52 will be explained by FIG. 1 with reference to FIG. 7 and FIG. 8(a).

First, as shown in FIG. 1(a), the four connecting blocks 74 and the four beam members 75 are arranged at predetermined intervals respectively.

Next, as shown in FIG. 1(b), the outer frame 71 is constructed by hermetically fitting and connecting these connecting blocks 74 and beam members 75 to one another, and the flange portions 80 of the lower cover 73 are fitted into the grooves 76, 79 of the lower side of the outer frame 71. Subsequently, the flange portions 80 of the upper cover 72 are fitted into the grooves 76, 79 of the upper side of the outer frame 71. A plurality of spacers 82 are mounted between the upper and the lower covers 72, 73.

After that, as shown in FIG. 1(c), foamable liquid urethane resin (R) (refer to FIG. 7 or FIG. 8) is charged from a filling port 84 into a panel space (P) (refer to FIG. 1(b)) enclosed by the outer frame 71 and both the covers 72, 73, and then the urethane resin (R) is foamed and solidified while the filling port 84 is plugged. An air purge hole (not illustrated) is pre-formed in the connecting block 74.

Figure 3:
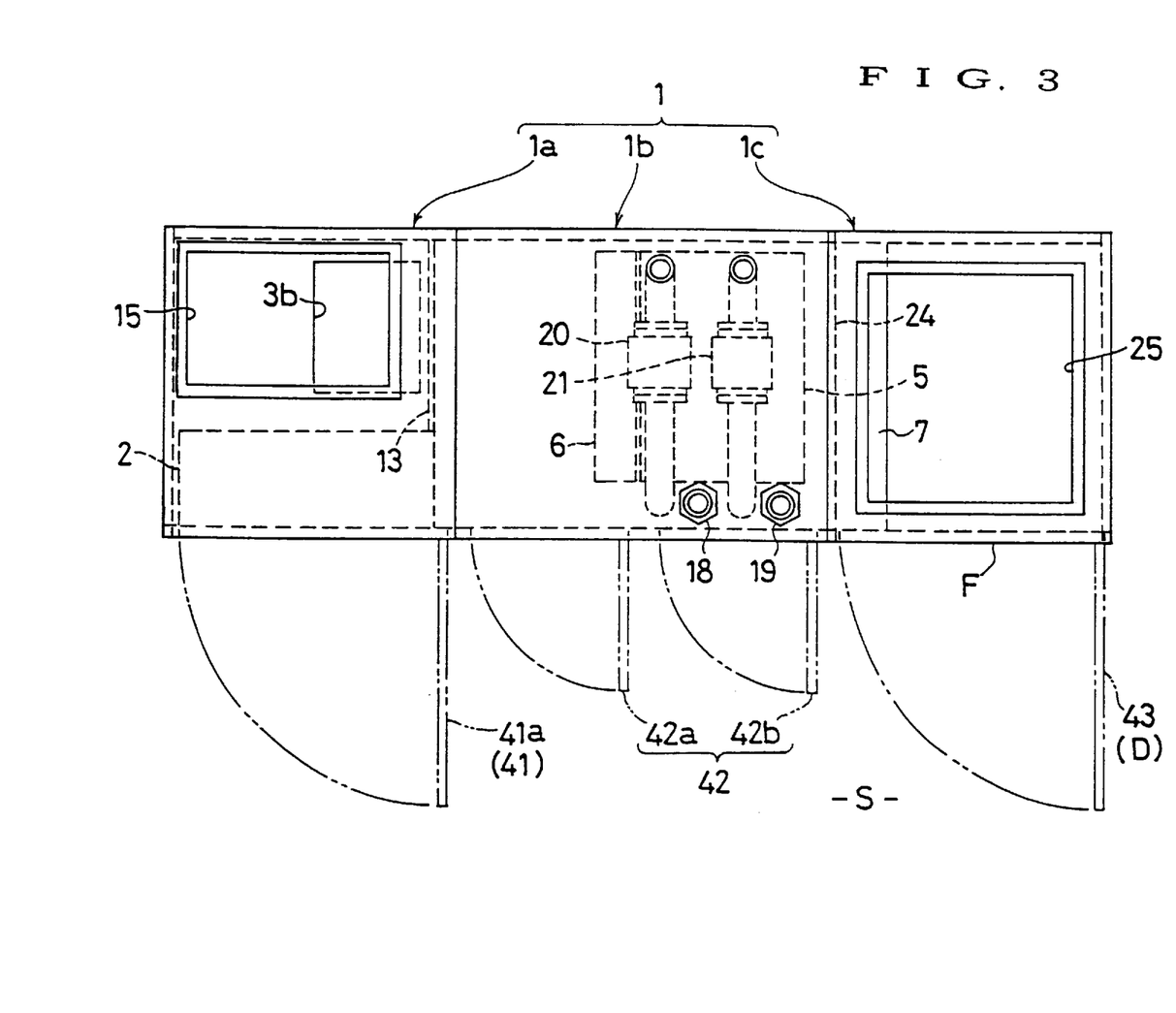
FIG. 3 is a plan view of the fan coil unit.

When the return air opening 25 and the likes in FIG. 3 are formed in the panel 52, as shown in FIG. 1(b), both the covers 72, 73 having opening portions 86 previously formed are assembled in accordance with the above-mentioned procedures and the urethane resin (R) is charged and foamed while the respective opening portions 86 are covered with masking sheets (not illustrated). After the resin (R) has been foamed and solidified, the masking sheets are removed and through-holes are formed in the panel 52 along the opening portions 86.

A through-hole 87 corresponding to the insertion hole 77 of the connecting block 74 is formed at each corner of the covers 72, 73 and another through-hole 88 is formed between the opposite corners. Another through-hole 88 is also subjected to the masking and the like treatment similarly with the above-mentioned opening portion 86.

A more concrete construction of the beam member 75 will be explained with reference to FIG. 8(*a*).

A pair of lips 90, 90 extend in the longitudinal direction (in the direction perpendicular to the paper in FIG. 8(*a*)) of the beam member 75 and projected integrally from a peripheral portion of a side of the beam member 75. A main body portion of the beam member 75 may be made of hard vinyl chloride resin. The lips 90, 90 may be made of soft vinyl chloride resin. These main body portion and lips 90, 90 may be formed integrally by means of extrusion molding. The lips 90, 90 are so formed as to gradually separate apart from each other toward their projecting ends, that is, away from the side of the main body portion.

As shown in FIG. 8(*b*), the panel 52 is attached to the frame 51*c* by self-tapping stepped screws 92. Under this attached condition, the lower cover 73 of the panel 52 is brought into airtight contact with a gasket 93 adhered to the frame 51*c* and the lips 90, 90 are brought into airtight contact with the gasket 93. This can keep an interior of the casing airtight assuredly.

Also the respective doors 41*a*, 41*b*, 42*a*, 42*b*, 43 (refer to FIG. 2) as the outer panels are constructed similarly with the above-mentioned screw-fixed panel 52.

Figure 9:
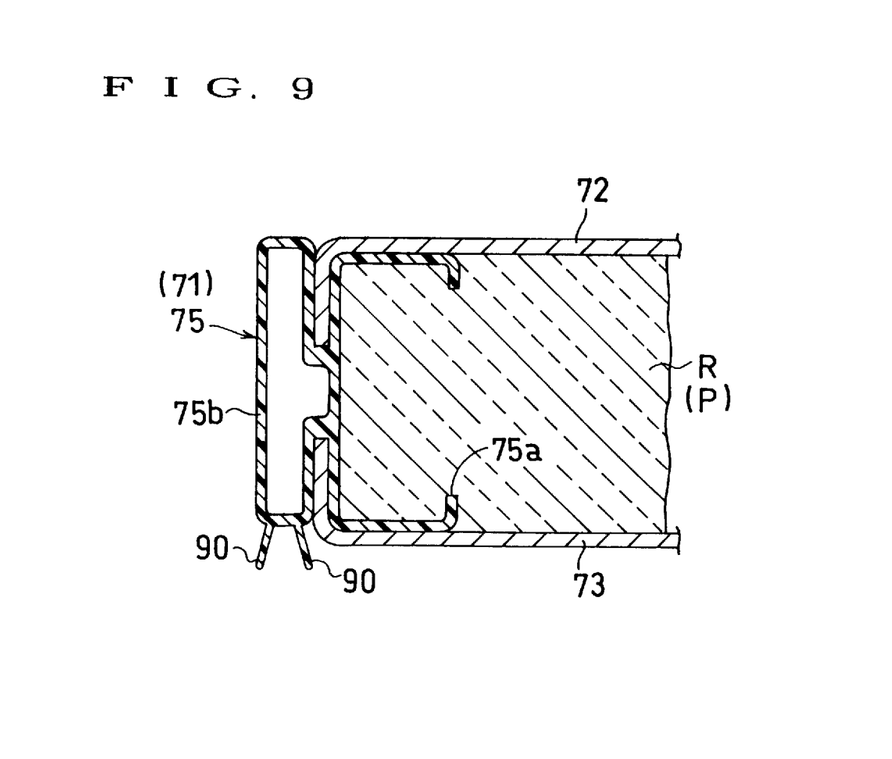
FIG. 9 shows a modified example of the outer panel and is a view corresponding to FIG. 8(a)

FIG. 9 shows a modified example of the outer panel and is a view corresponding to FIG. 8(*a*).

In this case, the lips 90, 90 are disposed symmetrically. An inner portion 75*a* of the beam member 75 is so formed as to have a C-shaped cross section and an outer portion 75*b* thereof is so formed as to be hollow entirely.

Figure 10:
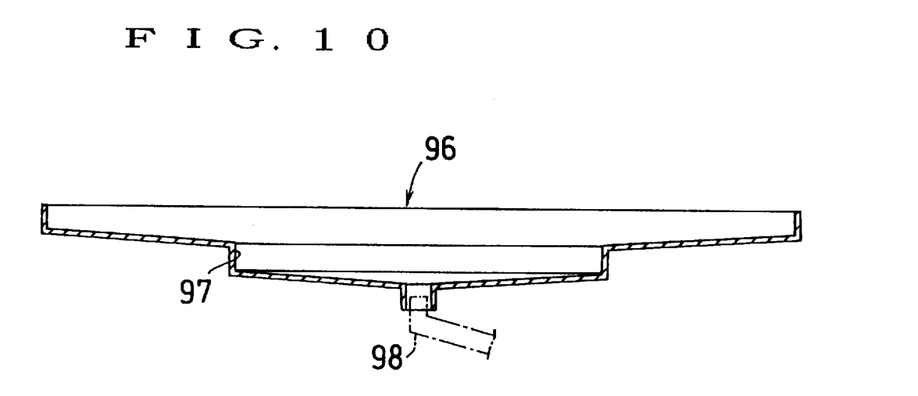
FIG. 10 is a sectional view of a drain pan disposed at a lower portion of the frame.

FIG. 10 shows a drain pan 96 arranged at a lower portion of each case 1*a*, 1*b*, 1*c* (refer to FIG. 2). A concaved portion 97 is formed at a mid portion of the drain pan 96, so that a large amount of condensed water dropped from a cooling water coil and so on can be received by the concaved portion 97. Numeral 98 designates a drain pipe.

The foregoing embodiment presents the following advantages.

Since the covers 72, 73 are fitted in both sides of the outer frame 71 which constructs a portion of the outer panel, it becomes possible to hermetically form the panel space (P) enclosed by the outer frame 71 and both the covers 72, 73. Therefore, when the synthetic resin (R) is charged into the panel space (P) or foamed therein, it becomes possible to prevent the synthetic resin (R) from leaking outside.

As a result, differently from the prior art, a working for removing the leaked and cured resin can be omitted, so that the outer panel can be manufactured efficiently and also finished better to present a good outlook.

Further, since the outer frame 71 is constructed by orderly connecting the connecting blocks 74 and the beam members 75 to one another, the connecting blocks 74 can be used as common component parts among various kinds of outer panels having different sizes. Therefore, it has become possible to reduce the manufacturing cost by decreasing the number of component parts of the outer panel. In addition, since the connecting block 74 has the heat insulating structure, the heat insulation property of the outer panel can be improved.

A block groove 76 is formed at each side of the connecting blocks 74, and a beam groove 79 is formed at each side of the beam members 75. Further, folded portions 80 adapted to be fitted into the block grooves 76 and the beam grooves 79 are formed at peripheral portions of the respective covers 72, 73. This construction can readily fit the covers 72, 73 in the outer frame 71. Therefore, the outer panel can be readily assembled and manufactured more efficiently.

Additionally, since the folded portions 80 of both the covers 72, 73 can be prevented from contacting with each other by the bottom portions of the grooves 76, (79), the heat insulation property of the outer panel can be further improved.

Moreover, since the beam member 75 is formed from synthetic resin and the lips 90 are projected integrally from the peripheral portion of the side of the beam member 75, the interior of the casing 1 to be covered with the outer panel can be surely kept airtight by the simple construction.

In addition, as a plurality of skirt-like lips 90 are projected integrally from the outer frame 71 made of synthetic resin, they can be brought into resilient contact with the frame 51 by attaching the outer panel to the frame 51. Therefore, should the outer panel be distorted, it becomes possible to prevent any gap from forming between the outer panel and the frame 51, thereby enabling the outer panel to enhance its property of sealing airtightly. Besides, the lips 90 being integrally formed with the outer frame 71, the outer panel can be manufactured with less labor and finished better in outlook when compared with the case of fitting the lips 90 in the main body portion of the outer frame 71 or bonding the former to the latter.

In an air conditioner of the type in which a pressure difference occurs between the inside and the outside of the casing 1, the lips 90 can be intimately contacted with the frame 51 by utilizing the pressure difference. Thus it is possible to maintain the airtight state more assuredly. Additionally, since the lips 90 are provided in plural number, they can sufficiently attend even if the interior of the casing 1 is in the state of either positive pressure or negative pressure.

Further, the paired lips 90 are formed so that they are gradually separating apart from each other toward their projecting ends. Therefore, under the condition that the lips 90 are resiliently contacted with the frame 51, it has become possible to form a relatively large airtight space between the paired lips 90, 90 and the frame 51. The formed airtight space can improve the heat insulation property as well as the sound-proof property. Besides, the above advantages can be attained by such a simple construction as providing a pair of lips 90, which leads to the possibility of reducing the manufacturing cost.

Being made of the soft resin, the lips 90 can be resiliently contacted with the frame 51 more assuredly to thereby further enhance the property of sealing airtightly. In addition, the soft resin lips 90 are integrally formed with the hard resin main body portion by molding, so that the manufacturing cost can be also reduced.

The above-described embodiment may be further modified as follows.

Instead of the exemplified structure comprising three cases, the casing 1 may be formed integrally or constructed by either two cases or at least four cases.

The above-mentioned door may be omitted and an entire surface of the frame may be covered with the screw-fixed panels.

It is enough that the synthetic resin to be charged into the panel space (P) between the outer frame 71 and the covers 72, 73 possess foamability and heat insulation. Instead of the urethane resin, other kinds of resins may be employed.

The outer frame 71 may have intermediate connecting blocks disposed between the corner connecting blocks 74, 74 so that these two kinds of connecting blocks can be orderly connected by beam members. In this case, rigidity of the outer frame 71 can be enhanced by connecting the opposed intermediate connecting blocks through the beam members.

Although the connecting blocks 74 and the beam members 75 are preferably provided in at least four sets, three sets may be sufficient. In this case, the outer frame (and the outer panel) is each formed in the shape of a triangle.

The lip 90 may be made of hard resin instead of the soft resin. The lip 90 may be single.

The covers 72, 73 may be manufactured by synthetic resin instead of the steel plates.

The air conditioner to which the outer panel of the present invention is applied may be of the ceiling built-in type or other types instead of the floor type.

What is claimed is:

1. An outer panel for an air conditioner comprising:
   an outer frame (71) having first and second sides as well as first and second openings, the outer frame (71) being provided with a plurality of insulating connecting blocks (74) arranged at predetermined intervals and a plurality of insulating beam members (75) connecting the blocks (74) to each other in order;
   a block groove (76) formed at an outer periphery of each of upper and lower sides of the connecting blocks (74) and a beam groove (79) formed in each of upper and lower sides side of the beam members (75) such that a continuous groove is formed at upper and lower sides of the outer frame (71);
   a first cover (72) having substantially straight and perpendicular flange portions (80) provided at peripheral portions thereof, the first cover being fitted in the first side of the outer frame (71) to cover the first opening of the outer frame (71) by fitting the respective flange portions (80) into the respective block grooves (76) and beam grooves (79) formed in the first side of the outer frame (71);
   a second cover (73) having substantially straight and perpendicular flange portions (80) provided at peripheral portions thereof, the second cover being fitted in the second side of the outer frame (71) to cover the second opening of the outer frame (71) by fitting the respective flange portions (80) into the respective block grooves (76) and beam grooves (79) formed in the second side of the outer frame (71);
   a panel space (P) enclosed by the outer frame (71) and both the covers (72), (73); and
   foamable synthetic resin (R) which is charged into the panel space (P).

2. An outer panel as set forth in claim 1, wherein the beam member (75) is formed from synthetic resin, the beam member (75) having an airtightly sealing lip (90) which extends longitudinally of the beam member (75) and projects from a peripheral portion of one side of the beam member (75).

3. An outer panel as set forth in claim 1, wherein said an outer frame (71) comprises synthetic resin, the outer frame (71) being composed of a main body portion having a side and at least one skirt-like lip (90) extending longitudinally of the outer frame (71), the lip (90) being integrally projected from the side of the main body portion.

4. An outer panel as set forth in claim 3 wherein a pair of the skirt-like lips (90), (90) are projected from the side of the main body portion of the outer frame (71), the pair of lips (90), (90) being gradually separated apart from each other away from the side of the main body portion of the outer frame (71).

* * * * *